United States Patent [19]
Mayr et al.

[11] 3,815,984
[45] June 11, 1974

[54] MOTION PICTURE CAMERA WITH MANUALLY AND AUTOMATICALLY ADJUSTABLE DIAPHRAGM

[75] Inventors: Helmut Mayr, Taufkirchen; Richard Pelte; Theodor Huber, both of Munchen, all of Germany

[73] Assignee: Agfa-Gevaert Aktiengesellschaft, Leverkusen, Germany

[22] Filed: Aug. 28, 1972

[21] Appl. No.: 284,346

[30] Foreign Application Priority Data
Aug. 28, 1971 Germany.................... 2143223

[52] U.S. Cl. ......................... 352/141, 95/10 CD
[51] Int. Cl. ............................................ G03b 7/08
[58] Field of Search...... 352/141; 95/10 CE, 10 CT, 95/10 CD, 64 D, 10 C

[56] References Cited
UNITED STATES PATENTS

| | | | |
|---|---|---|---|
| 2,186,613 | 1/1940 | Mihalyi | 352/141 X |
| 3,077,153 | 2/1963 | Gopfert | 95/64 D |
| 3,173,350 | 3/1965 | Steisslinger | 95/10 C |
| 3,336,850 | 8/1967 | Otani | 95/10 CT |
| 3,526,177 | 9/1970 | Kiper | 95/10 CE |

FOREIGN PATENTS OR APPLICATIONS
1,025,661   4/1966   Great Britain..................... 352/141

Primary Examiner—Monroe H. Hayes
Attorney, Agent, or Firm—Michael S. Striker

[57] ABSTRACT

A motion picture camera wherein one or more vanes of a diaphragm are connected to the rotary output shaft of a moving coil instrument. The instrument is connected in a diagonal of a bridge circuit one branch of which normally contains a photoelectric resistor so that, when the circuit is balanced, the diaphragm defines an aperture having a size which is a function of scene brightness. The photoelectric resistor can be disconnected from the instrument by a rotary cam whereby the instrument tends to move the vane or vanes to an end position corresponding to the maximum or minimum aperture size. The cam is rotatable by hand and has an arm which can move the vane or vanes of the diaphragm to a desired position as soon as the photoelectric receiver is disconnected. At the same time, the cam completes the circuit of an electric signal generating device to thus indicate that the aperture size has been selected by hand.

13 Claims, 4 Drawing Figures

MOTION PICTURE CAMERA WITH MANUALLY AND AUTOMATICALLY ADJUSTABLE DIAPHRAGM

BACKGROUND OF THE INVENTION

The present invention relates to photographic apparatus in general, especially to motion picture cameras, and more particularly to improvements in photographic apparatus of the type wherein the diaphragm is adjustable either automatically or by hand. Still more particularly, the invention relates to improvements in photographic apparatus of the type wherein the exposure control system is capable of adjusting the size of the aperture which is furnished by the diaphragm as a function of scene brightness and wherein the exposure control system employs a moving coil instrument or an analogous light measuring instrument for effecting an adjustment of the diaphragm so that the latter can furnish a range of aperture sizes each of which may be a function of a different scene brightness or each of which can be determined in advance and selected by the operator of the photographic apparatus. Stil more particularly, the invention relates to improvements in photographic apparatus wherein a moving coil instrument of the exposure control system is connected in a bridge circuit including a photosensitive receiver and has an output element whose position can be changed in dependency on changes in scene brightness to thereby directly or indirectly influence the aperture size.

SUMMARY OF THE INVENTION

An object of the invention is to provide a photographic apparatus, especially a motion picture camera, with a simple, rugged, reliable and easy-to-handle exposure control system which is capable of automatically adjusting the diaphragm as a function of changes in scene brightness and which further enables the user to manually select any desired f/stop.

Another object of the invention is to provide an exposure control system which is capable of automatically indicating that the aperture size which is defined by the diaphragm has been selected by hand.

A further object of the invention is to provide an exposure control system which enables the user to determine the actual aperture size irrespective of whether the diaphragm has been adjusted automatically or by hand.

An additional object of the invention is to provide a photographic apparatus with a novel and improved exposure control system which is simpler and less expensive but more reliable than heretofore known exposure control systems which allow for manual or automatic adjustment of the diaphragm.

The photographic apparatus of the present invention comprises a diaphragm having at least one portion (e.g., a pivotable vane) movable between a first end position, a second end position and a plurality of intermediate positions in which the diaphragm respectively defines a light-admitting aperture of maximum size, minimum size and a plurality of intermediate sizes. The apparatus further comprises novel and improved exposure control means which effects movements of the diaphragm portion and includes an electric control circuit (preferably a bridge circuit) having light measuring means (such as a moving coil instrument) which includes a rotary shaft or an analogous output portion operatively connected with and capable of changing the position of the movable diaphragm portion. The control circuit further includes photosensitive receiver means which is exposed to scene light (preferably by way of the aperture which is defined by the diaphragm) and is arranged to change the position of the output portion (and hence the position of the movable diaphragm portion) as a function of changes in scene brightness. The photosensitive receiver means is connectable with and disconnectable from the light measuring means of the control circuit and the output portion tends to move the movable diaphragm portion of one of its end positions in response to disconnection of the photosensitive receiver means from the light measuring means.

The exposure control means further comprises selector means (e.g., a manually rotatable cam) which is movable between an idle position (automatic selection of aperture size) and a range of additional positions (manual selection of aperture size) in which the photosensitive receiver means is respectively connected with and disconnected from the light measuring means, and motion transmitting means (e.g., a radially extending arm of the cam) for moving the output portion of the light measuring means and/or the movable diaphragm portion to thereby change the aperture size in response to movement of the selector means within the range of additional positions.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
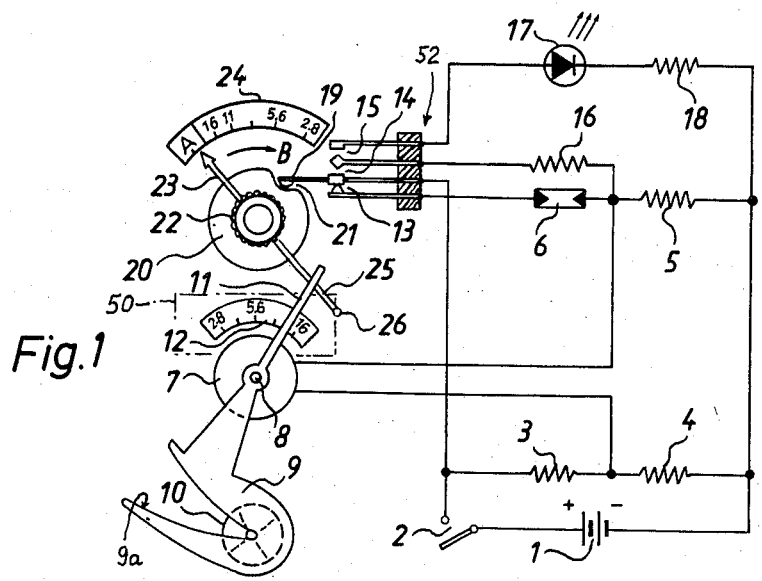
FIG. 1 is a fragmentary diagrammatic front elevational view of a motion picture camera which embodies one form of the invention.

Referring first to FIG. 1, there is shown a portion of a motion picture camera which comprises a battery or another suitable source 1 of electrical energy. The battery 1 can be connected with a bridge circuit in response to closing of a master switch 2. The bridge circuit comprises three branches which respectively include fixed resistors 3, 4 and 5, and a fourth branch which includes a photosensitive receiver here shown as a photoelectric resistor 6. The main diagonal of the bridge circuit contains a light measuring means here shown as a moving coil instrument 7 having a rotary output shaft 8 which carries a movable first diaphragm vane 9. The vane 9 is provided with a horn-shaped recess 9a. The diaphragm further comprises a stationary vane 10 which resembles a twin wedge. The angular position of the movable vane 9 with reference to the stationary vane 10 determines the momentary size of the aperture which is defined by the diaphragm to admit scene light to the foremost unexposed film frame.

The movable vane 9 of the diaphragm comprises an extension 11 which constitutes a pointer and is movable along an f/stop scale 12 provided with graduations and numerals indicating various f/stops. The scale 12 is mounted in or is observable by looking into the viewfinder 50 of the motion picture camera.

When the master switch 2 is closed by the operator, the positive pole of the energy source 1 is connected with a normally closed switch element 13 of a three-way electric switch 52 which further includes two additional switch elements 14 and 15. The switch elements 14 and 15 are open when the switch element 13 is closed and vice versa. When the switch element 13 is open and the switch element 14 is closed, the photosensitive receiver 6 is replaced in the bridge circuit by a fixed resistor 16 having an ohmic resistance which is lower than the minimum resistance of the receiver 6. The closing of the switch element 15 results in completion of the circuit of a visual signal generating diode 17 which can be observed in the viewfinder 50 or elsewhere in or on the photographic apparatus and lights up as soon as the switch element 15 is closed. The diode 17 is in series with a fixed resistor 18. When the switch element 15 is closed, the circuit of the diode 17 is completed from the positive pole of the energy source 1, by way of the closed master switch 2 and switch element 15, and to the negative pole of the energy source.

The upper contact of the switch element 13 (as viewed in FIG. 1) comprises an elastic extension 19 which constitutes a follower and can track the periphery of a disk-shaped selector cam 20. The cam 20 has a notch 21 which receives the tip of the elastic follower 19 when the cam 20 assumes the idle position shown in FIG. 1. The switch element 13 is then closed and the switch elements 14 and 15 are open. The selector cam 20 is connected with a manually rotatable knurled wheel 22 which can be reached from the outside of the camera body. Furthermore, the cam 20 is rigid with an index 23 which is movable along a stationary scale or dial 24. The graduations on the dial 24 include a graduation A which indicates that the motion picture camera is set for automatic selection of the aperture size, and a number of graduations which represent various f/stops adapted to be selected by hand in response to appropriate angular displacement of the knurled hand wheel 22. Still further, the selector cam 20 is provided with a motion transmitting arm 25 the free end portion 26 of which is bent at right angles to the plane of FIG. 1 and constitutes an entraining means or stop for the pointer 11 of the movable diaphragm vane 9.

Figure 2:
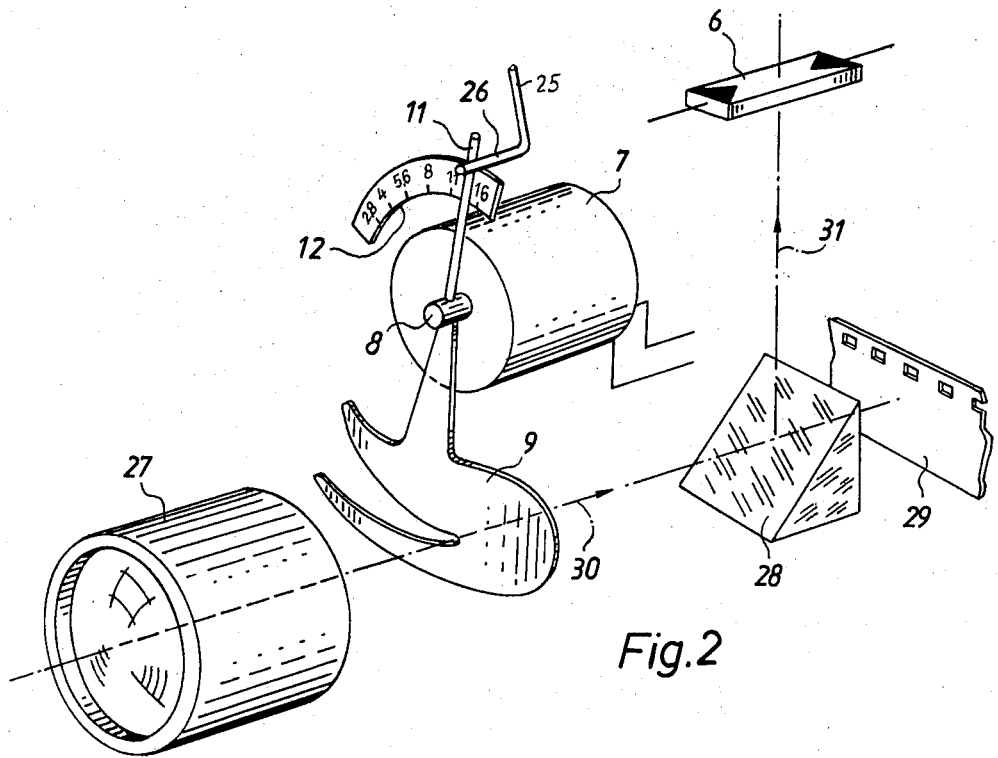
FIG. 2 is an enlarged perspective view of a portion of the structure shown in FIG. 1.

FIG. 2 illustrates the moving coil instrument 7, its output shaft 8, the movable diaphragm vane 9, the pointer 11 of the vane 9, a portion of the motion transmitting arm 25 with is stop 26, and the f/stop scale 12. FIG. 2 further illustrates a portion 29 of motion picture film which is located behind the picture taking lens 27. An optical element, here shown as a prism 28, is located behind the picture taking lens 27 to deflect from the incoming scene light 30 a portion 31 which impinges upon the light-sensitive surface of the photosensitive receiver 6. Some or all of the portion 31 of deflected light is directed into the viewfinder 50 (not shown in FIG. 2). It will be noted that the photosensitive receiver 6 is exposed to scene light which has passed through the aperture of the diaphragm 9, 10.

The operation of the structure shown in FIGS. 1 and 2 is as follows:

FIG. 1 shows that the selector cam 20 dwells in its normal or idle position in which the tip of its index 23 registers with the graduation A to thus indicate that the motion picture camera is set for automatic selection of the aperture size as a function of the intensity of scene light which impinges upon the photosensitive receiver 6. Since the tip of the elastic follower 19 is received in the notch 21 of the selector cam 20, the switch element 13 of the three-way switch 52 is closed and the switch elements 14 and 15 are open. Consequently, when the master switch 2 is closed, the photosensitive receiver 6 is connected in the bridge circuit (i.e., with the moving coil instrument 7) but the resistors 16, 18 and signal generating diode 17 are disconnected. The end portion 26 of the motion transmitting arm 25 of the selector cam 20 is located outside of the path of movement of the pointer 11 on the diaphragm vane 9 so that this vane can move through the entire range of its movements (between two end positions and through a plurality of intermediate positions) without striking the end portion 26. When the bridge circuit is balanced, the photosensitive receiver 6 offers a resistance which is a function of the intensity of prevailing scene light, and the angular position of the movable vane 9 is a function of the momentary resistance of the receiver 6. Consequently, the size of the aperture defined by the vanes 9 and 10 of the diaphragm is also a function of the intensity of prevailing scene light. The torque which is applied to the output shaft 8 is zero when the bridge circuit is balanced. Thus, the balancing of the bridge circuit invariably results in such positioning of the vane 9 that the size of the aperture is a function of the momentary scene brightness. The manner in which the exposures are being made in response to repeated opening and closing of the shutter (not shown) forms no part of the present invention.

If the user of the motion picture camera wishes to manually select the size of the aperture which is to be defined by the diaphragm including the vanes 9 and 10, the knurled hand wheel 22 is rotated in the direction indicated by the arrow B until the tip of the index 23 moves into register with a selected graduation on the right-hand portion of the dial 24. This dial can be observed by the operator, either in the viewfinder 50 or in another opening or window of the camera body. As soon as the selector cam 20 leaves the idle position shown in FIG. 1 and continues to turn in the direction indicated by the arrow B, the tip of the elastic follower 19 is expelled from the notch 21 whereby the follower 19 closes the switch elements 14 and 15 and simultaneously opens the switch element 13. Consequently, the photosensitive receiver 6 is replaced in the bridge circuit by the fixed resistor 16 having an ohmic resistance which is less than the lowest ohmic resistance of the receiver 6. At the same time, the closing of the switch element 15 results in completion of the circuit of the diode 17 which lights up and thus indicates to the operator that the motion picture camera has been set for manual determination of the aperture size. Of course, the diode 17 will light up only when the master switch 2 is closed.

Since the resistance of the fixed resistor 16 is less than the minimum resistance of the photosensitive receiver 6, the bridge circuit becomes unbalanced in immediate response to angular movement of the selector cam 20 from the idle position shown in FIG. 1. Consequently, the moving coil instrument 7 produces a torque which tends to rotate the output shaft 8 in a clockwise direction, as viewed in FIG. 1 so that the pointer 11 moves into abutment with the bent-over end portion 26 of the motion transmitting arm 25 on the selector cam 20. In other words, the parts 11, 26, 25 establish a mechanical motion transmitting connection between the selector cam 20 and the movable diaphragm vane 9 as soon as the index 23 of the cam 20 is caused to move into register with one of the f/stop graduations on the dial 24. As the user continues to turn the selector cam 20 in a clockwise direction (see the arrow B), the end portion 26 of the motion transmitting arm 25 pivots the diaphragm vane 9 toward a position in which the vanes 9 and 10 define a larger aperture for admission of incoming scene light. Inversely, if the operator decides to turn the index 23 from register with the f/stop graduation 2.8 toward register with the graduation 5.6, 11 or 16, the torque which is produced by the moving coil instrument 7 and is applied to the output shaft 8 causes the movable vane 9 to turn in a clockwise direction so as to maintain the pointer 11 in engagement with the end portion 26 whereby the size of the aperture which is furnished by the vanes 9 and 10 decreases. It will be noted that the end portion 26 will turn the diaphragm vane 9 in a counterclockwise direction when the index 23 is moved clockwise (arrow B), and that the moving coil instrument 7 will turn the diaphragm vane 9 in a clockwise direction, as viewed in FIG. 1, when the operator moves the index 23 in a counterclockwise direction. As soon as the photosensitive receiver 6 is replaced with the resistor 16, the instrument 7 tends to move the vane 9 to an end position corresponding to the minimum aperture size.

The resistor 16 can be an adjustable resistor or a photoelectric resistor, as long as its resistance at any given scene brightness is less than the resistance of the receiver 6 so that the instrument automatically moves the pointer 11 against and thereupon maintains the pointer 11 in constant engagement with the end portion 26 of the arm 25 as soon as the selector cam 20 leaves the idle position of FIG. 1 and assumes one of a range of additional positions in each of which the switch element 13 is open.

Figure 3:
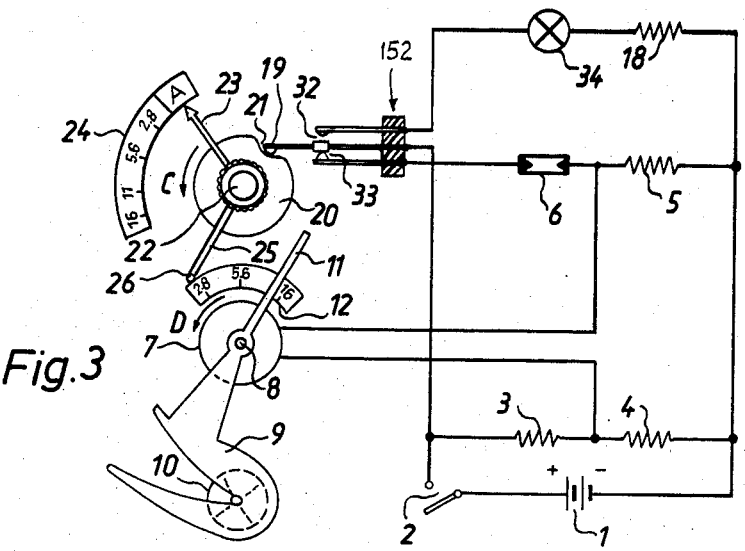
FIG. 3 is a fragmentary diagrammatic front elevational view of a motion picture camera which embodies a second form of the invention.

FIG. 3 illustrates a portion of a second motion picture camera wherein all such parts which are identical with or clearly analogous to the corresponding parts of the camera shown in FIGS. 1 and 2 are denoted by similar reference characters. The three-way switch 52 of FIG. 1 has been replaced with a two-way switch 152 having a normally closed switch element 33 corresponding to the switch element 13 of FIG. 1 and a normally open switch element 32 corresponding to the switch element 15 of FIG. 1. The diode 17 of FIG. 1 is replaced with a modified signal generating device here shown as a conventional incandescent lamp 34 which is in series with the resistor 18. The resistor 16 of FIG. 1 has been omitted so that, when the switch element 33 opens in response to angular displacement of the selector cam 20 in the direction indicated by the arrow C, the photosensitive receiver 6 is replaced by an infinitely large ohmic resistance (open switch element 33). In other words, the disconnection of photosensitve receiver 6 does not result in its replacement with a fixed resistor, but rather with a resistor (open switch element 33) whose resistance (in the open position thereof) is higher than the maximum resistance of the receiver 6.

Automatic selection of the aperture size which is defined by the diaphragm vanes 9 and 10 takes place in the same way as described in connection with FIG. 1. Thus, when the index 23 of the selector cam 20 registers with the graduation A on the dial 24, the camera will automatically select an aperture size which is a function of the prevailing scene brightness, namely, of the intensity of light which impinges on the photosensitive receiver 6. The end portion 26 of the motion transmitting arm 25 on the selector cam 20 is then moved out of the way of the pointer 11 on the movable diaphragm vane 9. If the user of the camera wishes to select by hand a particular f/stop, for example, the f/stop 5.6, the hand wheel 22 is rotated in a counterclockwise direction as indicated by the arrow C. The cam 20 expels the extension or follower 19 of the common contact of the switch elements 32, 33 from the notch 21 whereby the switch element 33 opens to disconnect the photosensitive receiver 6 and the switch element 32 closes to cause the incandescent lamp 34 to light up, provided that the master switch 2 is closed. Consequently, the bridge circuit becomes unbalanced and the moving coil instrument 7 produces a torque which tends to turn the output shaft 8 and the pointer 11 with the movable diaphragm vane 9 in a counterclockwise direction (see the arrow D). Thus, the pointer 11 engages the end portion 26 of the motion transmitting arm 25, and the aperture size is determined by the angular position of the index 23. It will be noted that the moving coil instrument 7 of FIG. 3 tends to turn the output shaft 8 in a counterclockwise direction (aperture of maximum size) whereas the instrument 7 of FIG. 1 tends to rotate its output shaft in a clockwise direction (aperture of minimum size). Otherwise, the operation of the camera of FIG. 3 with manual selection of the aperture size is the same as that described in connection with FIG. 1.

Figure 4:
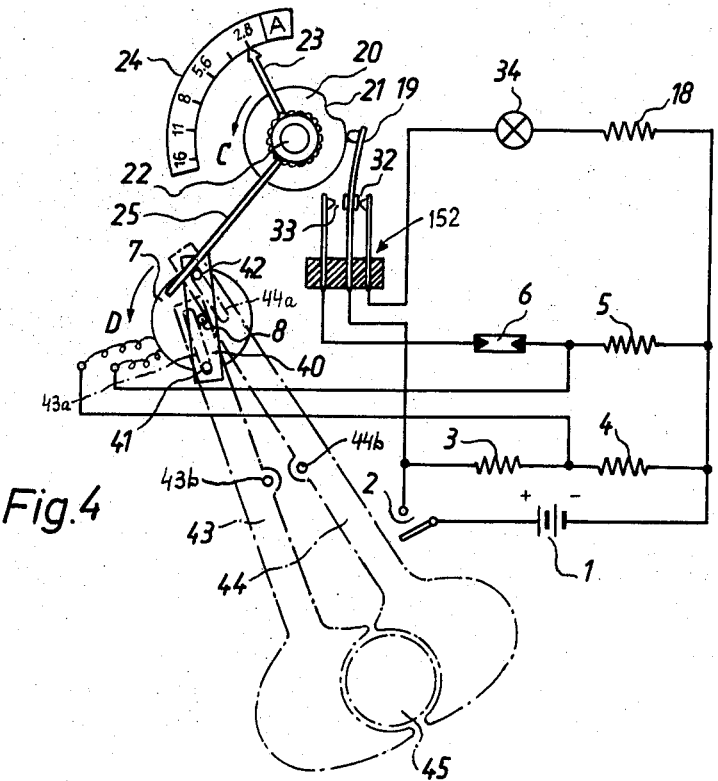
FIG. 4 is a fragmentary diagrammatic front elevational view of a motion picture camera which embodies a third form of the invention.

FIG. 4 illustrates a portion of a third motion picture camera which is similar to the camera shown in FIG. 3. Therefore, all such parts of the camera shown in FIG. 4 which are identical with or clearly analogous to the corresponding parts of the structure of FIG. 3 are denoted by similar reference characters. The output shaft 8 of the moving coil instrument 7 is connected with a two-armed lever 40 which is provided with two projections 41 and 42 located diametrically opposite each other and constituting pins or studs which extend into elongated slots 43a, 44a respectively provided in the movable diaphragm vanes 43 and 44. The vanes 43 and 44 are pivotable in the camera body, as at 43b and 44b. The lower end portions of the diaphragm vanes 43 and 44 define an aperture whose size is a function of the angular position of the output shaft 8 of the moving coil instrument 7. The reference character 45 denotes a fixed light-admitting opening for the incoming scene light. In the angular positions shown in FIG. 4, the diaphragm vanes 43, 44 define an aperture of maximum size so that they do not obstruct any parts of the opening 45.

The selector cam 20 is shown in one of its additional positions in which the elastic follower 19 is expelled from the notch 21 and the index 23 registers with the f/stop graduation 2.8 on the dial 24. Consequently, the motion transmitting arm 25 (which need not be provided with a bent-over end portion 26) engages the pin 42 and maintains the lever 40 in an angular position in which the diaphragm vanes 43 and 44 define a relatively large aperture corresponding to the selected f/stop 2.8. The elastic follower 19 maintains the switch element 33 in open position so that the photosensitive receiver 6 is disconnected from the moving coil instrument 7. At the same time, the follower 19 closes the switch element 32 so that the incandescent lamp 34 lights up as soon as the master switch 2 is closed in order to indicate to the user that the motion picture camera is set for manual determination of the aperture size. When the user returns the selector cam 20 into an angular position corresponding to the idle position shown in FIG. 3, the tip of the follower 19 reenters the notch 21 so that the switch element 32 opens and the switch element 33 closes. At the same time, the motion transmitting arm 25 is moved out of the way of the pins 42 and 41 on the lever 40 so that the angular positions of the diaphragm vanes 43, 44 are determined exclusively by the moving coil instrument 7 as a function of the prevailing scene brightness. The arrow D indicates the direction in which the moving coil instrument 7 tends to rotate its output shaft 8 in response to opening of the switch element 33. Such tendency of the moving coil instrument 7 insures that the pin 42 of the lever 40 invariably abuts against the motion transmitting arm 25 as soon as the index 23 is moved out of register with the graduation A on the dial 24. In all other respects, the operation of the structure shown in FIG. 4 is identical with that of the structure illustrated in FIG. 3.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations are intended to be comprehended within the meaning and range of equivalence of the appended claims.

What is claimed as new and desired to be protected by Letters Patent is set forth in the appended claims:

1. In a photographic apparatus, particularly in a motion picture camera, a combination comprising a diaphragm having at least one portion movable between a first end position, a second end position and a plurality of intermediate positions in which said diaphragm respectively defines a light-admitting aperture of maximum size, minimum size and a plurality of intermediate sizes; and exposure control means or effecting movements of said diaphragm portion, including an electric control circuit having light measuring means comprising a mobile output portion operatively connected with said portion of said diaphragm, an energy source normally connected with said light measuring means, photosensitive receiver means exposed to scene light and arranged to change the position of said output portion as a function of changes in scene brightness, said receiver means being connectable with and disconnectable from said light measuring means and said light measuring means tending to move said portion of said diaphragm to one of said end positions by way of said output portion thereof in response to disconnection of said receiver means from said light measuring means, and a cam movable between an idle position and a range of additional positions in which said receiver means is respectively connected with and disconnected from said light measuring means and in which said cam does not disconnect said light measuring means from said energy source, said cam including motion transmitting means movable into direce engagement with said portion of said diaphragm to thereby change the aperture size in response to movement of said cam within said range of additional positions, said exposure control means further comprising electric switch means including a switch element which is respectively open and closed when said receiver means is respectively disconnected from and connected with said light measuring means, said switch element including a contact provided with follower means tracking said cam to close said switch element in the idle position and to open the switch element in each additional position of said cam.

2. A combination as defined in claim 1, wherein said control circuit includes a bridge circuit and said light measuring means includes a moving coil instrument having a rotary element constituting said output portion.

3. A combination as defined in claim 2, wherein said receiver means is a photosensitive resistor which is normally connected in one branch of said bridge circuit and is exposed to scene light by way of said aperture.

4. A combination as defined in claim 1, further comprising indicating means and means for actuating said indicating in response to movement of said cam from said idle position.

5. A combination as defined in claim 4, wherein said indicating means comprises an electric signal generating device and said means for actuating said indicating means includes a normally open switch element which closes in response to movement of said cam from said idle position to thereby complete the circuit of said signal generating device.

6. A combination as defined in claim 1, wherein said portion of said diaphragm is rigid with said output portion.

7. A combination as defined in claim 1, wherein said exposure control means further comprises a resistor which is connected with said light measuring means in response to movement of said cam from said idle position to thereby impart to said output portion the tendency to move said diaphragm portion of said one end position.

8. A combination as defined in claim 7, wherein said photosensitive receiver means comprises a photoelectric resistor having a minimum resistance exceeding the resistance of said first mentioned resistor.

9. A combination as defined in claim 7, wherein said photosensitive receiver means comprises a photoelectric resistor having a maximum resistance which is less than the resistance of said first mentioned resistor.

10. A combination as defined in claim 1, wherein said portion of said diaphragm is a vane which is rigid with said output portion and includes an extension engaging with said motion transmitting means in response to movement of said cam from said idle position.

11. A combination as defined in claim 1, wherein said cam is rotatable by hand between said idle position and said additional positions thereof.

12. A combination as defined in claim 1, wherein said cam includes an index and further comprising a dial cooperating with said index to pinpoint the positions of said cam.

13. A combination as defined in claim 1, wherein said cam is a rotary disk having a peripheral notch which receives said follower means in said idle position of said cam.

* * * * *